United States Patent [19]

Ramon et al.

[11] 4,233,745
[45] Nov. 18, 1980

[54] WARPAGE GAGE

[75] Inventors: Thomas Ramon, Park Forest, Ill.; Richard O. Peck, Lakewood, Colo.

[73] Assignee: Amsted Industries Incorporated, Chicago, Ill.

[21] Appl. No.: 736,563

[22] Filed: Oct. 28, 1976

[51] Int. Cl.³ ............................ G01B 7/02; G01B 7/28
[52] U.S. Cl. .............................. 33/174 L; 33/174 PA; 33/174 Q
[58] Field of Search .......... 33/174 L, 174 PA, 174 Q, 33/174 P

[56] References Cited

U.S. PATENT DOCUMENTS

| 3,254,416 | 6/1966 | Eisele | 33/174 Q |
| 3,696,513 | 10/1972 | Sullivan | 33/174 L |
| 3,895,446 | 7/1975 | Orlov | 33/174 PA |

Primary Examiner—Willis Little
Attorney, Agent, or Firm—Edward J. Brosius; Fred P. Kostka

[57] ABSTRACT

There is provided a warpage gage for railroad wheels and the like wherein a suitable support such as a fixed plate is fitted with spacers adapted to seat against a planar surface of the wheel. A plurality of displacement gages are carried by the support, each adapted to seat against the planar surface to be gaged. The displacement gages provide an indication of the deviation of the planar surface from a true plane.

7 Claims, 5 Drawing Figures

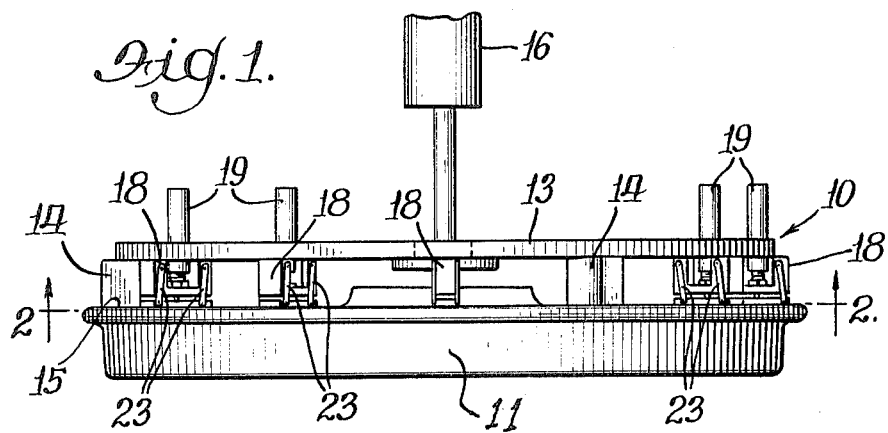
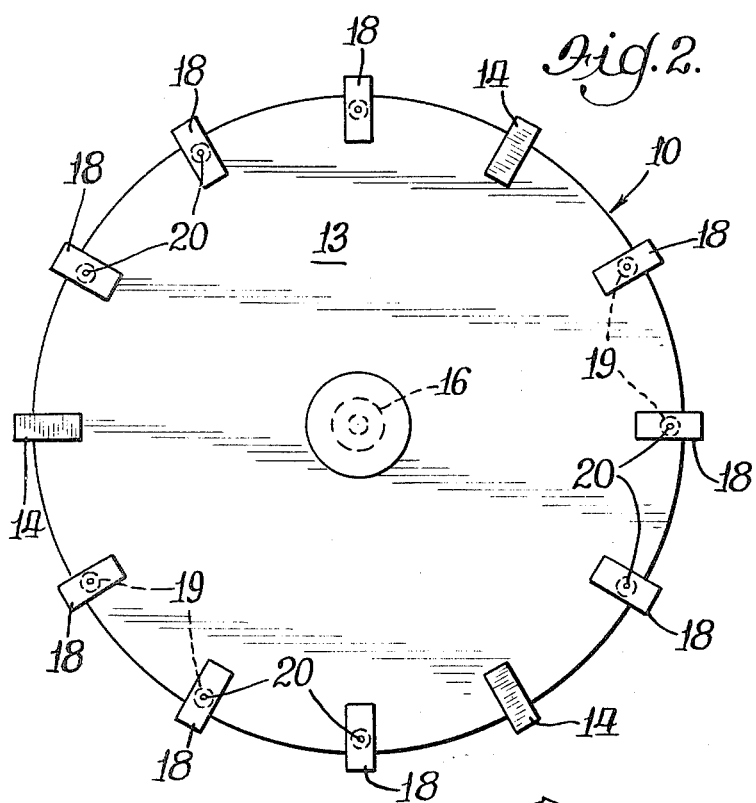
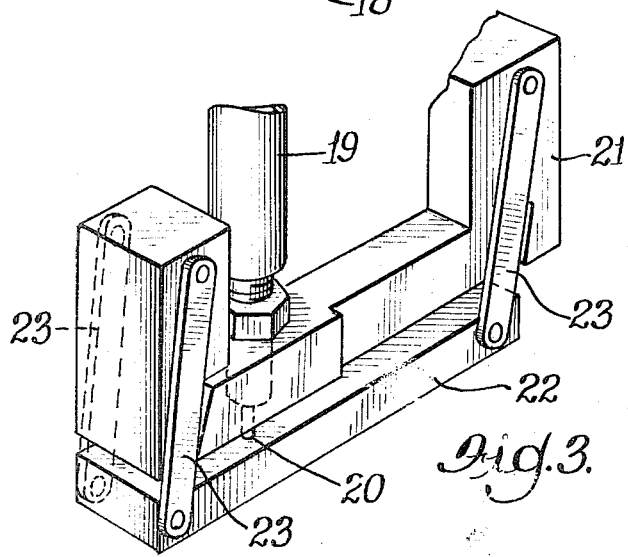
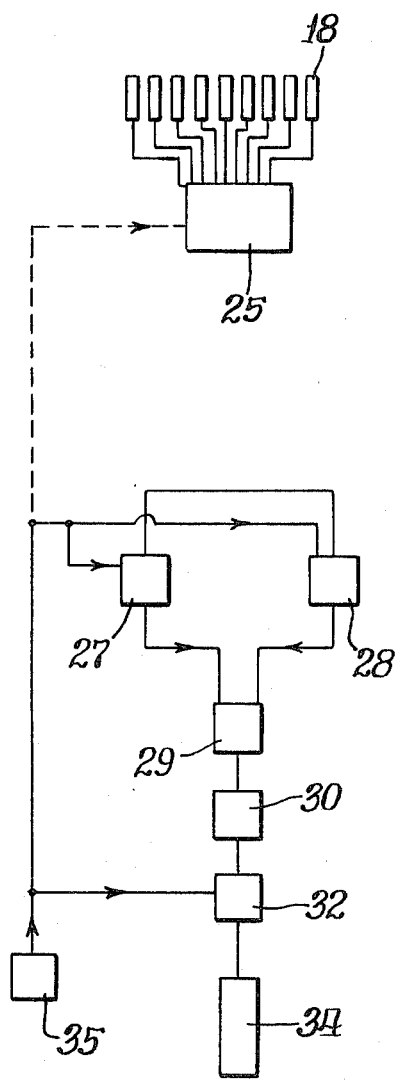

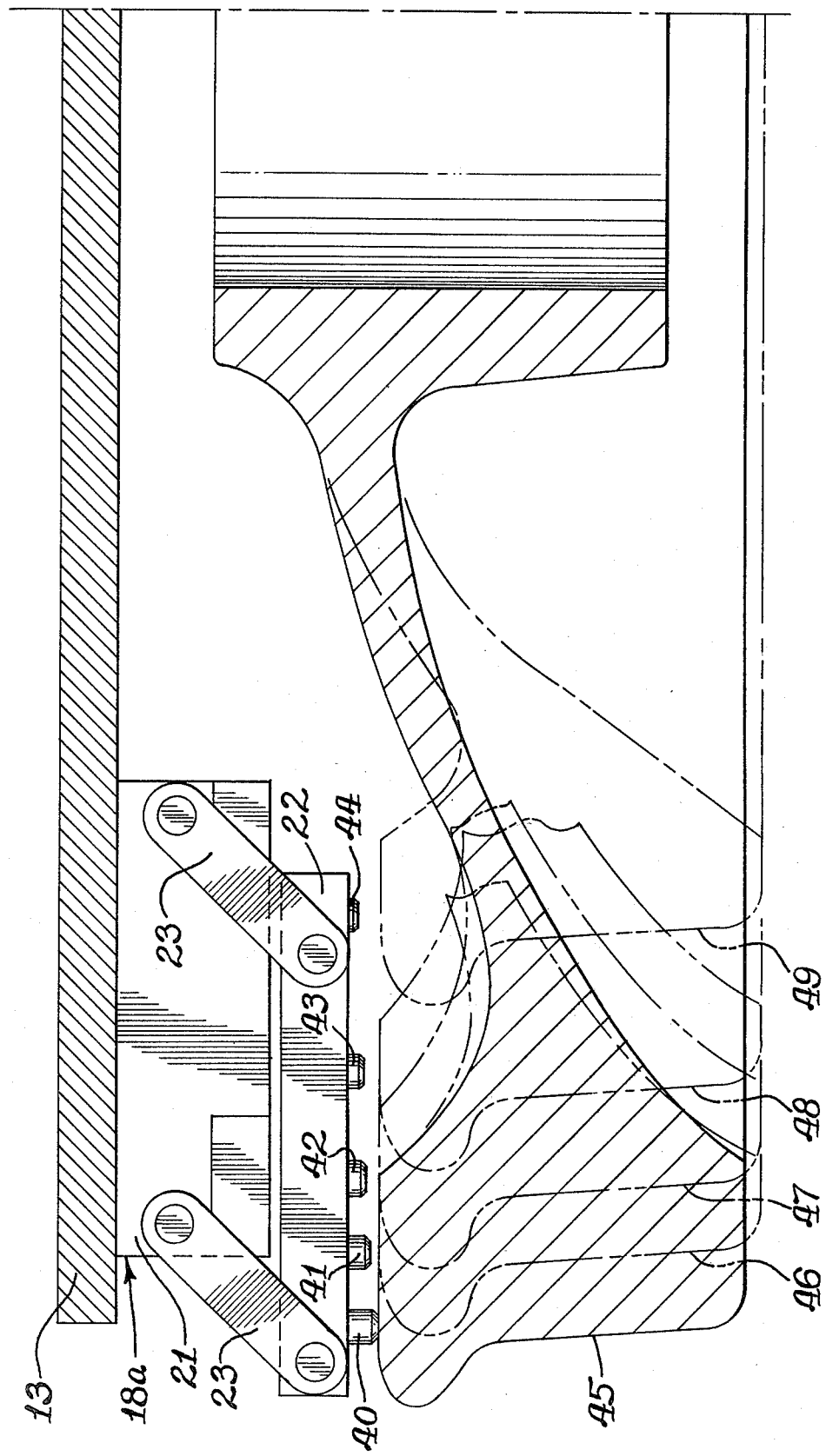

WARPAGE GAGE

BACKGROUND AND SUMMARY OF THE INVENTION

The present invention relates to a warpage gage and more particularly to a warpage gage for railroad wheels and the like.

Heretofore, it has been the customary production testing of the warpage of railroad wheels to measure the deviation of the railroad wheel from a true plane with feeler gages. It will be appreciated that such manual measuring of railroad wheels is time consuming and subject to human judgments.

Accordingly, it is an object of the present invention to provide an improved warpage gage for production measuring of railroad wheels and the like.

Still another object of the present invention is the provision of a warpage gage which overcomes the above-mentioned difficulties.

Yet another object of the present invention is the provision of an improved warpage gage for production gaging of railroad wheels.

In accordance with these and other objects of the present invention, there is provided an improved warpage gage for railroad wheels and the like and including a generally planar support member having three equispaced members adapted to seat against a planar surface such as the back rim face of a railroad wheel or the like. The support member also carries a plurality of spaced displacement gages adapted to seat against the planar surface.

In accordance with one embodiment of the invention the displacement gages are of the low voltage differential transformer type transducer and an electrical circuit is provided to electrically scan one transducer at a time, and to electrically compare the results, so that the sum or difference of the maximum peak readings are obtained to provide a suitable indication of the deviation from a true plane.

BRIEF DESCRIPTION OF THE DRAWINGS

FIG. 1 is an elevational view of a warpage gage applied to a back rim face of a railroad wheel in accordance with the present invention;

FIG. 2 is a bottom view of the warpage gage of FIG. 1, taken along line 2—2 of FIG. 1;

FIG. 3 is a perspective view of a typical displacement gage carried by the warpage gage of FIG. 2; and FIG. 4 is a block diagram illustrating a typical electrical scanning and reading circuit for use with the warpage gage of FIGS. 1 through 3; and FIG. 5 is a fragmentary cross sectional of a modified displacement gage as applied to various diameter wheels.

DESCRIPTION OF THE EMBODIMENT OF FIGS. 1 to 5

Referring now to the drawings and particularly to FIG. 1, there is illustrated a warpage gage 10 positioned to measure the warpage of a railroad wheel 11. The warpage gage 10 includes a planar support member 13 having three equispaced spacer members 14. The support member 13 is placed parallel to three points on the flat back rim face 15 of the railroad wheel 11. The spacer members 14 as shown are equidistant 120° from each other so as to align the planar support member 13 parallel to the planar rim face 15 of the wheel. A fluid cylinder 16 is provided for raising the support member off the railroad wheel 11, and for lowering the support member until the spacer blocks 14 rest on the railroad wheel 11.

As best illustrated in FIG. 2, there is provided a plurality of spaced displacement gages 18 carried on the support member 13 and also positioned to seat against the back rim face 15 of the wheel 11 when the support member 13 is lowered. Each of the displacement gages 18 includes a displacement transducer 19, FIG. 3, having a position sensing member or rod 20. Each displacement transducer is carried on a gage body 21 so that the position sensing member 20 rests against a movable foot plate 22. The movable foot plate 22 is carried by the gage body 21 in any suitable manner, and is here shown as pivotally connected thereto by a plurality of connecting links 23. It will be appreciated that as viewed in FIGS. 1 and 3, pivoting motion of each movable foot plate 22 will provide a vertical component of motion which in turn will displace the position sensing member 20.

In operation the warpage gage 10 is lowered against a planar surface, such as the illustrated back rim face 15 of the wheel 11 until the spacer members 14 rest on the planar surface of the wheel. At the same time, the movable foot plates 22 will adjust themselves to any depth or height required by the loci at which they are, individually, making contact on the back rim face 15. It will be understood that the movable foot plates 22 will in turn position the position sensing members 20 of the displacement transducers 19 to provide an indication or measure of the warpage of the planar surface 15.

If desired, suitable electrical circuitry can be provided to electrically scan the displacement transducers, compare the displacement thereof electrically, and thereafter provide a suitable indication of the warpage of the planar surface. A suitable electronic circuit is illustrated in FIG. 4. The output of the linear displacement transducers 18 is fed into a scanner 25 which tracks electronically one transducer at a time, feeding the result into a pair of analog peak memory modules 27 and 28. One of the peak memory modules 27 will electronically record the maximum negative peak and the other of the peak memory modules 28 will electronically record the maximum positive peak. The output of the peak memory modules 27 and 28 in turn is fed into a sum-difference processor 29 wherein the maximum warpage of the planar surface 25 is electronically tabulated. The output of the sum-difference processor may be utilized in any desired manner and in the illustrated block diagram the output of the sum-difference processor 29 is fed into a limit detector processor 30 which has been preset to the acceptable tolerance of warpage. If the warpage from the sum-difference processor exceeds the setting of the limit detector processor 30, then a suitable signal is triggered in a logic indicator 32. It will be appreciated that the signal may be either visual or audible or both. If desired, a further display of the warpage may be provided in a display unit 34 which provides a digital readout of the sum-difference processor and which further may be programmed to provide digital read-outs of displacements of the individual transducers through the scanning operation. A suitable reset 35 is provided to return the electronic circuit to a neutral position upon completion of the testing cycle. The reset 35 may be either manually or automatically operated in any convenient manner such as activated by raising of the support member 13.

DESCRIPTION OF THE EMBODIMENT OF FIG. 5

FIG. 5 illustrates an embodiment of the displacement gage to provide point contact between the foot plate and a wheel rather than line contact thereby compensating if the wheel back face is not a perfect plane. As therein illustrated there is shown a gage 18a carried on the planar support member 13. The gage 18a has the gage body 21 carrying the movable foot 22 connected thereto by the plurality of connecting links 23. The movable foot 22 carries a plurality of hardened steel tips 40, 41, 42, 43 and 44 positioned radially of the centerline of the support member 13 and of increasing thickness or depth radially outwardly thereof.

Each of the tips is spaced radially to contact the back face of a different diameter wheel. Tip 40 is shown in contact with the back face of a wheel 45, representing a commercial 40" wheel; tip 41 is aligned to contact the back face of a wheel 46, shown in phantom, representing a commercial 38" wheel; tip 42 is aligned to contact the back face of a wheel 47, shown in phantom, representing a commercial 36" wheel; tip 43 is aligned to contact the back face of a wheel 48, shown in phantom, representing a commercial 33" wheel; and tip 44 is aligned to contact the back face of a wheel 49, shown in phantom, representing a commercial 28" wheel.

Advantageously, the point contact provided by the tips 40, 41, 42, 43 and 44 reduces the reading tolerances and maintains a high degree of accuracy.

It should be understood that the arrangements described above constitute preferred embodiments and that many adaptations and modifications may be made without departing from the spirit of the invention.

What is claimed is:

1. A warpage gage for railroad wheels and the like comprising:

a generally circular, planar support means;

at least three spaced spacer means affixed near the edge of said support means and adapted to seat against a generally planar surface to be gaged thereby positioning said support means at a predetermined distance from said planar surface;

and a plurality of spaced displacement gages affixed near the edge of said support means, each adapted to seat against the planar surface to be gaged, each of said displacement gages generating a signal representative of the displacement thereof, said signals thereafter being utilized to determine the warpage of the planar surface.

2. A warpage gage as set forth in claim 1 wherein said displacement gages are electrical transducers.

3. A warpage gage as set forth in claim 1 wherein each of said displacement gages include a movable foot plate adapted to rest on the planar surface to be gaged and a displacement transducer having a position sensing member engageable by said movable plate.

4. A warpage gage as set forth in claim 3 wherein each of said movable feet is provided with at least one downwardly extending tip adapted to contact the back surface of a wheel.

5. A warpage gage as set forth in claim 4 wherein each of said movable feet is provided with a plurality of said downwardly extending tips radially aligned relative to the center of said support member and each positioned to contact the back surface of a selected size of wheel.

6. A warpage gage as set forth in claim 5 wherein said plurality of tips is of increasing thickness radially outwardly of the centerline of said support member.

7. A warpage gage as set forth in claim 1 and including means for moving said support member relative to the surface to be gaged to rest said spacer members against said surface and to bring said displacement gages into engagement with said surface.

* * * * *